1,748,456

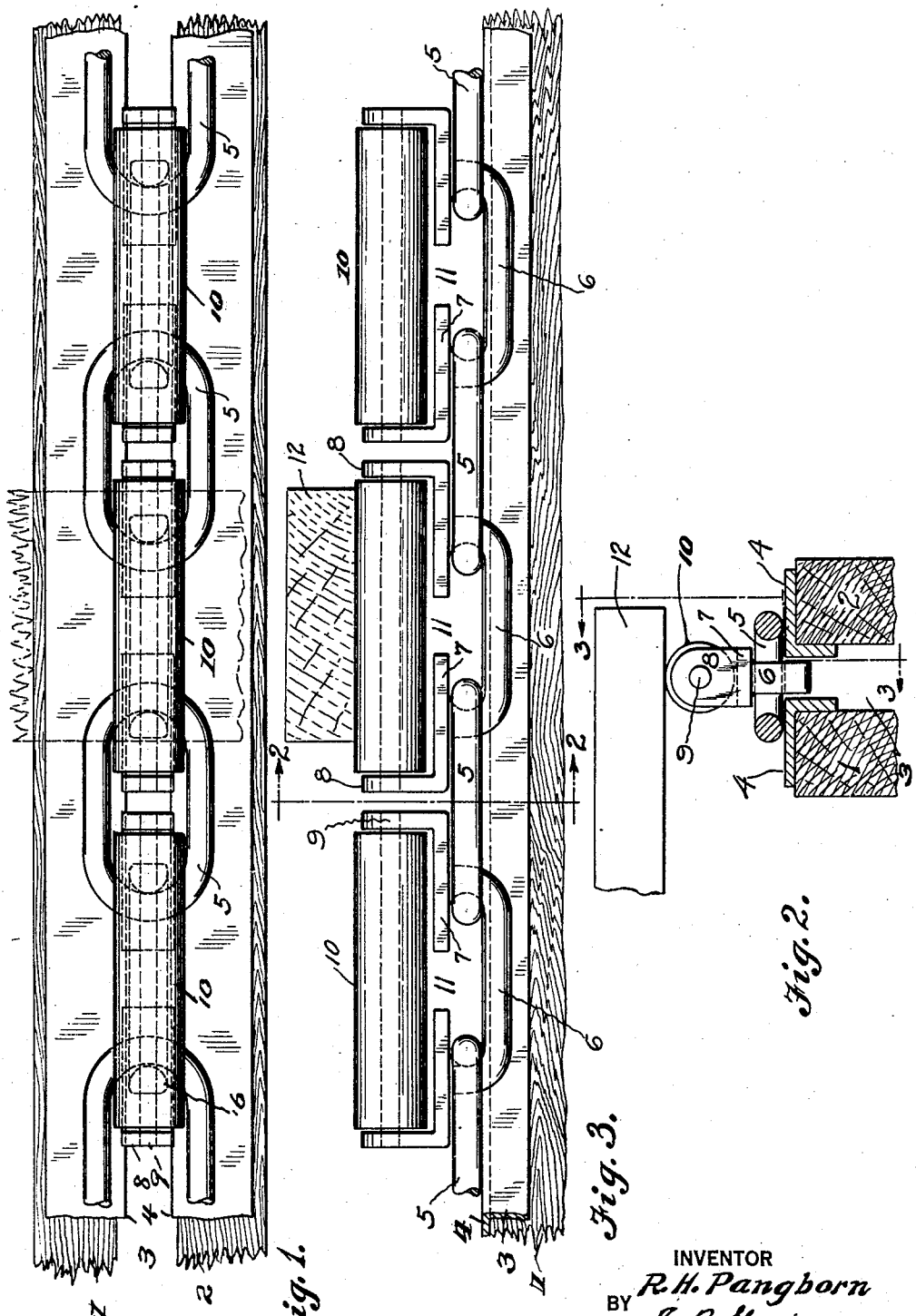
Feb. 25, 1930. R. H. PANGBORN 1,748,456
CONVEYER CHAIN
Original Filed June 1, 1928
INVENTOR
R.H. Pangborn
BY F. P. Torin
ATTORNEY Patented Feb. 25, 1930

UNITED STATES PATENT OFFICE

REDMOND H. PANGBORN, OF TACOMA, WASHINGTON, ASSIGNOR OF ONE-HALF TO HILL HUDSON, OF PIERCE COUNTY, WASHINGTON

CONVEYER CHAIN

Application filed June 1, 1928, Serial No. 282,159. Renewed December 23, 1929.

This invention relates to improvements in conveyer chains and has for its principal object to provide a chain in which the upper portion thereof will present a substantially continuous and unbroken surface to receive a load.

In the United States patent issued to me on September 6, 1927, No. 1,641,642 I illustrated and described a roller which produced a cam-like action of a log, timber, or other load thrust sidewise against the chain, and such a roller could be used with the present invention. In one sense the present invention is an improvement upon that shown in my prior patent, in that I teach a method of producing a chain which is less expensive and more satisfactory than the cost of production of the chain embraced in said patent.

I accomplish these and other objects by the peculiar arrangement and combination of the parts as will be more fully hereinafter described and explained in the following specification, shown in the accompanying drawings, and finally pointed out in the appended claims.

In the accompanying drawings:

Fig. 1 is a plan view of the chain showing a portion of a trackway and guide channel.

Fig. 2 is a sectional view upon the line 2—2 of Fig. 3.

Fig. 3 is a side elevation of one of the chains and one side of the trackway, about as viewed from the line 3—3 of Fig. 2, looking in the direction of the arrows.

Referring now more particularly to the drawing, numerals 1 and 2 indicate timbers which are in spaced relation to each other as shown, leaving a channel 3 between them. Along one of the edges of each of the timbers, I prefer to secure metallic L-shaped members 4 so as to receive the wear and friction which would otherwise be received by the timbers. 5 indicates the horizontally disposed links of the chain and 6 the vertical links, which when the chain is in position, extend into the channel 3 and between the timbers 1 and 2, the horizontal links riding upon the metallic members 4 (see Fig. 2).

The vertically disposed links are of peculiar construction which I will not describe. Upon the upper surfaces of the vertically disposed links, I form platforms 7, whose ends are up-turned as at 8 and suitably pierced so as to receive pintles 9 mounted upon which are rollers 10 in the present illustration of the invention. The platforms may be continuous, or if desired to save weight and metal, the ends of the platforms 8 may be spaced apart from each other, leaving gaps 11 so that a load such as a timber indicated at 12 coming upon the chain at an angle to the chain, will ride up upon the chain instead of thrusting directly against the side of the chain and thus subjecting it to undue abuse and wear.

In the operation, the load, of course, is carried by the substantially continuous surface represented by the upper surface of the rollers, and the chains run uniformly and smoothly with their vertically disposed links within the channel 3. The horizontally disposed links are the usual oblong chain links well known in the art, and require no change in construction to adapt them to use in my invention. The vertically disposed links may be either drop forged or formed of malleable castings, and as will be appreciated, the assembly of the chain is convenient and simple.

While I have shown a particular form of embodiment of my invention, I am aware that many minor changes therein will readily suggest themselves to others skilled in the art without departing from the spirit and scope of my invention. I therefore desire to avoid being limited to the exact form of embodiment which I have herein shown and described.

Having described by invention, what I claim as new and desire to protect by Letters Patent, is:—

1. A conveyer chain including a series of horizontally disposed links, half links connecting the said links, the ends of the half links extending through adjacent ends of two separate links, means on the ends of the half links supporting a roller between and connecting said ends.

2. A chain of the character described, comprising a series of horizontally disposed spaced apart links, half links connecting the horizontal links, the ends of the half links extending through adjacent ends of the horizontal links, a platform mounted on each upper end of the half links, the adjacent ends of the platform being spaced apart and the outer ends of said platforms having extended portions with bearings, and a roller supported in the bearings on the platforms of each half link.

In testimony whereof I affix my signature.

REDMOND H. PANGBORN.